Patented Feb. 17, 1942

2,273,047

UNITED STATES PATENT OFFICE 2,273,047

CAR WHEEL

Reid L. Kenyon, Middletown, Ohio, and Harry Tobin, Butler, Pa., assignors to The American Rolling Mill Company, Middletown, Ohio, a corporation of Ohio No Drawing. Application November 10, 1939, Serial No. 303,877

22 Claims. (Cl. 295—1)

Our invention has for its principal object the provision of a car wheel which has all of the desirable physical properties of the best wheels of current manufacture and in addition is resistant to both thermal cracking and shelling. It will be understood that ordinary wear on the rim of the wheel cannot determine the life of the wheel if the wheel is subject to sudden failure through thermal cracking or shelling or both; and further that whereas ordinary wear may be taken care of by regular inspection methods and the turning-off of the rims of worn wheels or the substitution of new wheels, the sudden failure of the wheels may result in very serious damage to life and property, and is an ever-present hazard in the operation of rolling stock.

Under severe brake applications, where sudden and great fluctuations of temperature occur, cracks are likely to develop in the rim of the wheel which are known as thermal cracks. Sometimes deep cracks are formed at the outset; but more often small or incipient cracks, difficult or impossible to detect by the usual inspection methods, develop into deep ones in the course of service. It sometimes happens that one of these cracks will progress far enough so that the wheel rim will crack through during use, whereupon the crack will travel more or less circularly around, or partly around, the plate of the wheel, thus causing abrupt failure. This progression of the crack, through the rim and into the plate, is hastened by any internal stresses present in the wheels, or such stresses as are present or increased in them during use.

The phenomenon of shelling is the spalling-off or breaking out of pieces of the tread portions of the rims of car wheels, and this may necessitate machining away considerable layers of service metal from the rim in order to recondition the wheel for further service. Shelling may go hand in hand with thermal cracking, the thermal cracks being the starting point for the shelling-out of portions of the tread. Both not only constitute serious safety hazards but necessitate the turning-off of considerable service metal from the rim to remove the cracks and shell-outs.

It is consequently an object of our invention to produce a car wheel which is safer than car wheels heretofore produced. A further object is to provide a wheel which is more economical to use due to the decreased loss of service metal resulting from machining away thermal cracks and shelling.

Previous attempts to overcome thermal cracking have all been to lower the carbon and this increases the tendency to shell. This is recognized in the A. A. R. specifications for heat treated wheels which sets up three classes with carbon ranges as follows:

|  | Per cent |
|---|---|
| Class A carbon_____not over____ | 0.63 |
| Class B carbon_____ | 0.57 to 0.67 |
| Class C carbon_____ | 0.67 to 0.80 |

Circular No. D. V. 959 of the Mechanical Department, Association of American Railroads, from which the above is taken, states, "If trouble is being experienced with thermal cracking in high speed service, and since thermal cracking is unquestionably connected with braking conditions, wheels according to Classes 'A' or 'B,' which would have a comparatively low carbon content, would probably best meet this situation. Where trouble is being experienced on account of shelling treads which occurs frequently under locomotive tenders with heavy wheel loads, wheels corresponding to grade 'C,' which have a carbon range very similar to that of Specification M—107, but are heat treated to a minimum hardness of 321 Brinell, will prove of value from the standpoint of resistance to shelled treads."

Our invention makes it possible to obtain increased resistance to thermal cracking without incurring shelling.

In a copending case entitled Wrought Steel Wheels, Serial No. 321,276, filed Feb. 28, 1940, which is a continuation in part of an application Serial No. 126,734 filed Feb. 19, 1937, we have set forth our discovery that the phenomenon of thermal cracking is diminished, the further the steel is kept from an eutectoid composition.

In using this teaching the carbon was lowered and through experiment it was found advantageous to raise the manganese to produce a steel of desirable physical properties. Further research has shown that similar resistance to thermal cracking can be obtained in spite of holding the carbon at a relatively high value, such as about 0.70%, by lowering the manganese to a relatively low value, such as about 0.35%. In the regular analysis car wheel steel (A. A. R. specification M—107), the carbon and manganese are both of about the same order of magnitude, that is, about 0.75%. In the first case we lowered the carbon and raised the manganese, while in the present case we have maintained a relatively high value of carbon and lowered the percentage of manganese. We have made the further discovery that by adding a suitable quantity of aluminum to the molten steel the resistance to thermal cracking is increased over essentially the entire range of carbon and manganese. In effect this makes it possible to work closer to the eutectoid composition than without aluminum. As a consequence, an object of the present invention is to provide for the securing of non-thermal-cracking and non-shelling effects, specifically in steels of what might be termed the usual or current compositions, and more broadly in steels of a wide and controllable range of compositions, and to secure enhanced freedom from these defects in steels of any composition otherwise suitable for the intended use.

A further object of our invention is the securing of non-thermal-cracking effects in compositions without the carbon limitations inherent in former attempts. An object of our invention is also a concurrent solution of the thermal-cracking and shelling problems.

These and other objects of our invention which will be set forth hereinafter or will be apparent to one skilled in the art upon reading these specifications, we accomplish by that procedure and in those compositions of which we shall now set forth certain exemplary embodiments.

Standard compositions for railroad car wheels (in accordance with A. A. R. Specification M-107) call for carbon from 0.67 to 0.82% and manganese from 0.60 to 0.85%. Wheels made of steel within these compositional ranges, are subject to severe thermal checking or cracking in use. Previous attempts to minimize the thermal cracking have taken the direction of reducing the carbon. Lowering the carbon decreases the resistance of the wheel to shelling.

It will be understood that the occurrence of thermal cracking depends chiefly upon the composition and characteristics of the metal, rather than on any heat treatments to which the wheel has been subjected during manufacture. Resistance to shelling can be increased by heat treatments which raise the hardness and yield-strength, but it is obvious that the amount of improvement obtainable by heat treatments that do not produce high internal stresses in the finished wheels, is dependent on the chemical composition. High-carbon steels are more amenable to improvement in this regard by heat treatment than low-carbon steels.

Microscopic examination of the tread of wheels that have been subjected to severe braking and which have developed thermal cracks shows that the surface had been heated above the $A_3$ temperature, that at this temperature the carbon had been dissolved, and that the cooling in many cases had been sufficiently rapid to result in the formation of brittle micro constituents such as martensite or extremely fine pearlite. The presence of martensite is evidence that the critical cooling rate was exceeded. The critical cooling rate is a property of the steel that determines how fast it must be cooled to result in the formation of martensite.

The greater the critical cooling rate of a steel, the less chance there is for the formation of the hard, brittle micro constituents under the conditions of service which normally would produce thermal cracking; instead, a softer, more ductile micro-structure results which is less susceptible to thermal cracking. Our teachings are that the higher the critical cooling rate can be made, within commercial limits of course, the less trouble will be had with thermal cracking.

In the copending case the principle of staying away from the eutectoid was employed by lowering the carbon. We have since found that the lowering of either the carbon or the manganese increases the critical cooling rate and as explained above this results in an increase in the resistance to thermal cracking.

To further increase the critical cooling rate we may treat the molten steel with aluminum. A relatively small quantity of aluminum may be used, say one-half to two pounds of aluminum per ton of molten steel. The actual quantity of aluminum (acid-soluble) remaining in the steel after solidification will vary with the characteristics of the steel and the quantity of aluminum used. The exact amount of residual aluminum is not critical but it is necessary that at least some be present and we have found that a minimum of 0.015% is desirable and that a quantity at least as great as 0.08% is not deleterious. The effectiveness of the aluminum increases as the carbon and manganese is reduced and therefore the amount of residual aluminum may be advantageously varied with the percentage of carbon and manganese. The treatment with aluminum increases the critical cooling rate and rate of transformation of the steel; it refines the austenitic grain; and it permits the use of carbon ranges with ranges of alloying ingredients hitherto impossible if thermal-cracking resistance is to be had.

Following our invention we have produced car wheels having excellent physical properties and a high resistance to thermal cracking and shelling within the following ranges:

|  | I | II |
| --- | --- | --- |
| Carbon_____per cent__ | 0.45 to 0.75 | 0.45 to 0.75 |
| Manganese_____do____ | 0.20 to 0.55 | 0.20 to 0.85 |
| Aluminum_____lbs. per ton__ |  | ½ to 2 | there being no other alloying ingredients in the iron beyond those ordinarily found in car wheel steels, though any special alloying ingredients which do not essentially either decrease the critical cooling rate or increase the sluggishness of the transformation, such, for example, as copper, cobalt, titanium, zirconium, tungsten and vanadium may be added without departing from the spirit of the invention. The greatest resistance to shelling will be obtained with carbon near the upper limit of the range given; and to render such a steel suitably resistant to thermal cracking, the manganese must be near the lower limit of its range, while to give it the maximum resistance to thermal cracking, aluminum may be added as specified above.

The commercial requirements for car wheels can be met within the formula ranges given above; but other ranges of composition which give steels with a rapid transformation and a high critical cooling rate will also be effective in increasing the resistance to thermal cracking.

In the steels described above the resistance to thermal cracking increases as carbon or manganese or both are reduced; but the aluminum increases the resistance to thermal cracking over the whole range given. The utmost resistance to thermal cracking alone is secured with carbon and manganese both in the lower part of their ranges; but it is not always desirable to do this on account of decreasing the resistance to shelling and with a carbon of say 0.50%, manganese of say 0.72% may be indicated. Such a wheel when made of steel which has been treated with aluminum in accordance with our teachings is an excellent wheel.

But a simultaneous solution of the thermal-cracking and the shelling problems is highly desirable. Lower manganese combined with higher carbon approaches such as simultaneous solution. In other words, the higher carbon leads to higher hardness and yield-strength so that the resistance to shelling will be increased, provided that the wheel is given a suitable heat treatment such as is commonly used for steels of the particular composition employed.

The reduction of manganese together with the addition of aluminum offsets the thermal cracking which would result from the higher carbon, thus producing a good resistance to thermal cracking in compositions within the ranges above. Thus an aluminum treated steel containing 0.36% manganese or thereabouts and 0.70% carbon or thereabouts, when properly heat treated, approaches the maximum simultaneous resistance to both shelling and thermal cracking.

In applying our teaching to secure resistance to thermal cracking, the general principles governing the selection of particular compositions within the ranges given are, (1) The carbon and manganese should be varied so that as the carbon content is increased the manganese content is decreased, and vice versa, and (2) The treatment of the molten steel with aluminum will increase the thermal cracking resistance of a steel with a given composition or the sum of the carbon and manganese can be increased and still maintain a satisfactory resistance to thermal cracking.

The examples of specific compositions given herein are not intended to be limiting except where specifically claimed. Throughout the range given above an improvement is obtained with respect to thermal cracking as compared with steels of similar carbon content but with higher manganese and without aluminum treatment. In the higher carbon ranges given, resistance to thermal cracking is still obtained and yet the resistance to shelling of properly heat-treated wheels is not diminished as in the case of previous thermal-cracking-resistant wheels. Furthermore these effects are obtained over a broad enough range to be practical; the carbon limitation heretofore inherent in attempts to avoid thermal cracking is eliminated, so that the manufacturer is more or less free to select a composition which will give the desired mechanical properties such as hardness, yield strength, ductility and impact resistance as the user may require; and by reason of their remarkable resistance to both thermal cracking and to shelling, our wheels constitute a major contribution to safety in this art.

Having thus described our invention what we claim as new and desire to secure by Letters Patent is:

1. A ferrous wheel for railroad rolling stock and the like containing carbon of the order of .70%, and manganese, the manganese in said wheel being limited to a maximum of 0.50%, the said wheel being rendered further resistance to thermal cracking and shelling by the addition of one-half to two pounds of aluminum per ton to the molten steel, the balance of the metal in said wheel being substantially all iron.

2. A ferrous wheel for railroad rolling stock and the like having enhanced resistance to thermal cracking, and formed of a steel containing carbon of the order of 0.50% and manganese of the order of 0.70%, and residual (acid-soluble) aluminum not less than substantially 0.015%, balance substantially all iron.

3. A ferrous wheel as claimed in claim 1, in which the resistance to shelling is retained and the resistance to thermal cracking is further enhanced by the addition of one-half to two pounds of aluminum per ton to the molten metal, and which in addition contains one or more alloying ingredients chosen from a class consisting of copper, cobalt, titanium, zirconium, tungsten, and vanadium.

4. A ferrous wheel as claimed in claim 2, which in addition contains one or more alloying ingredients chosen from a class consisting of copper, cobalt, titanium, zirconium, tungsten, and vanadium.

5. A ferrous wheel for railroad rolling stock and the like, and having the property of resistance to thermal cracking, the said wheel containing from 0.45 to 0.75% carbon and from 0.85 to 0.20% manganese, the carbon and manganese varying as respects each other in inverse order, and containing a minimum residual (acid-soluble) aluminum of the order of 0.015%.

6. A car wheel having enhanced thermal cracking resistance, and having a composition within the following ranges:

|  | Per cent |
|---|---|
| Carbon | 0.45 to 0.75 |
| Manganese | 0.20 to 0.85 |
| Balance substantially all iron | | the said steel having been treated with aluminum while molten, and containing a small residual quantity of aluminum, the carbon and manganese within said ranges varying as respects each other in inverse order.

7. A steel car wheel having enhanced thermal cracking resistance, and formed of steel of a composition consisting of:

|  | Percent |
|---|---|
| Carbon | 0.45 to 0.75 |
| Manganese | 0.20 to 0.50 |
| Balance substantially all iron | | the said steel having been treated with aluminum while molten, and containing a small residual quantity of aluminum.

8. A steel wheel having enhanced thermal cracking resistance, and formed of steel of a composition consisting of:

|  | Per cent |
|---|---|
| Carbon | 0.45 to 0.75 |
| Manganese | 0.50 to 0.85 |
| Balance substantially all iron | | the carbon and manganese varying with respect to each other in inverse order, the said steel having been treated with aluminum while molten, and containing a small residual quantity of aluminum.

9. A steel wheel having enhanced thermal cracking resistance, and formed of steel of a composition consisting of:

|  | Per cent |
|---|---|
| Carbon of the order of | 0.50 |
| Manganese of the order of | 0.72 |
| Balance substantially all iron | | the said steel having been treated with aluminum while molten, and containing a small residual quantity of aluminum.

10. A steel wheel having enhanced thermal cracking resistance and normal shelling resistance, and formed of steel of a composition consisting of:

| | Percent |
|---|---|
| Carbon of the order of | 0.70 |
| Manganese of the order of | 0.36 |
| Balance substantially all iron | | the said steel having been treated with aluminum while molten, and contaiing a small residual quantity of (acid-soluble) aluminum.

11. A ferrous wheel for railroad rolling stock and the like, having enhanced resistance to thermal cracking, and consisting of steel containing residual (acid-soluble) aluminum of the order of 0.015 to 0.085%, according to the carbon and manganese content, the said steel having a high speed of transformation and critical cooling rate, in which steel the carbon is of the order of 0.45 to 0.75%, with manganese of the order of 0.85 to 0.20%, the carbon and manganese varying with respect to each other in inverse order, the balance substantially all iron, with the usual content of alloy ingredients for car wheel compositions.

12. A ferrous wheel as claimed in claim 11 which in addition contains one or more alloying ingredients chosen from a class consisting of copper, cobalt, titanium, zirconium, tungsten and vanadium.

13. A ferrous wheel for railroad rolling stock and the like, and having the property of resistance to thermal cracking, the said wheel containing carbon of the order of 0.50% and from substantially 0.50% to 0.85% manganese, and containing a minimum residual (acid soluble) aluminum of the order of 0.015%, balance substantially all iron.

14. A ferrous wheel for railroad rolling stock and the like, and having the property of resistance to thermal cracking, the said wheel containing carbon of the order of 0.60% and from 0.50% to 0.85% manganese, and containing a minimum residual (acid soluble) aluminum of the order of 0.015%, balance substantially all iron.

15. A ferrous wheel for railroad rolling stock and the like, and having the property of resistance to thermal cracking, the said wheel containing carbon of the order of 0.60% and manganese of the order of 0.65%, and containing a minimum residual (acid soluble) aluminum of the order of 0.015%, balance substantially all iron.

16. A ferrous wheel for railroad rolling stock and the like, and having the property of resistance to thermal cracking, the said wheel containing carbon of the order of 0.60% and manganese of the order of 0.65%, and containing a minimum residual (acid soluble) aluminum of the order of 0.015%, the said wheel containing in addition one or more alloying ingredients chosen from a class consisting of copper, cobalt, titanium, zirconium, tungsten and vanadium, balance substantially all iron.

17. A ferrous wheel for railroad rolling stock and the like, said wheel being resistant to thermal cracking, the said wheel containing carbon of the order of 0.70% and from substantially 0.20 to 0.55% manganese, and containing minimum residual (acid soluble) aluminum of the order of 0.015%, balance substantially all iron.

18. A ferrous wheel for railroad rolling stock and the like, said wheel being resistant to thermal cracking, the said wheel containing carbon of the order of 0.60% and from substantially 0.20% to 0.55% manganese, and containing a minimum residual (acid soluble) aluminum of the order of 0.015%, balance substantially all iron.

19. A ferrous wheel for railroad rolling stock and the like, said wheel being resistant to thermal cracking, the said wheel containing carbon of the order of 0.50% and from substantially 0.20% to 0.55% manganese, and containing minimum residual (acid soluble) aluminum of the order of 0.015%, balance substantially all iron.

20. A ferrous wheel for railroad rolling stock and the like, said wheel being resistant to thermal cracking, the said wheel containing carbon of the order of 0.70%, manganese of the order of 0.30%, and containing a minimum residual (acid soluble) aluminum of the order of 0.015%, balance substantially all iron.

21. A ferrous wheel for railroad rolling stock and the like, said wheel being resistant to thermal cracking, the said wheel containing carbon of the order of 0.60%, manganese of the order of 0.40%, and containing a minimum residual (acid soluble) aluminum of the order of 0.015% balance substantially all iron.

22. A ferrous wheel for railroad rolling stock and the like, said wheel being resistant to thermal cracking, the said wheel containing carbon of the order of 0.50%, manganese of the order of 0.40%, and containing a minimum residual (acid soluble) aluminum of the order of 0.015%, balance substantially all iron.

REID L. KENYON.
HARRY TOBIN.